United States Patent
Yoshida

(10) Patent No.: US 10,154,173 B2
(45) Date of Patent: Dec. 11, 2018

(54) IMAGE PROCESSING APPARATUS, IMAGE PROCESSING SYSTEM, AND IMAGE PROCESSING METHOD FOR SUPPRESSING FRADULENT USAGE OF AN IMAGE PROCESSING APPARTUS BY A THIRD PARTY

(71) Applicant: Yuuichi Yoshida, Kanagawa (JP)

(72) Inventor: Yuuichi Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/001,576

(22) Filed: Jan. 20, 2016

(65) Prior Publication Data

US 2016/0269596 A1  Sep. 15, 2016

(30) Foreign Application Priority Data

Mar. 9, 2015  (JP) ................................ 2015-045669

(51) Int. Cl.
  *G06F 3/12* (2006.01)
  *H04N 1/44* (2006.01)

(52) U.S. Cl.
  CPC ......... *H04N 1/4413* (2013.01); *G06F 3/1222* (2013.01); *G06F 3/1236* (2013.01); *G06F 3/1238* (2013.01); *G06F 3/1292* (2013.01); *H04N 1/4406* (2013.01); *G06F 3/1204* (2013.01); *H04N 2201/006* (2013.01); *H04N 2201/0094* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2010/0188683 | A1* | 7/2010 | Shirai | G06F 21/608 358/1.13 |
| 2013/0250354 | A1* | 9/2013 | Kato | H04N 1/00217 358/1.15 |
| 2014/0108064 | A1* | 4/2014 | Glass | G06Q 10/06398 705/5 |
| 2014/0293306 | A1* | 10/2014 | Tredoux | H04B 5/0031 358/1.13 |

(Continued)

FOREIGN PATENT DOCUMENTS

JP    2014-007677    1/2014

*Primary Examiner* — Barbara Reinier
(74) *Attorney, Agent, or Firm* — IPUSA, PLLC

(57) ABSTRACT

An image processing apparatus includes a receiving unit configured to receive, from an information processing apparatus, request information including unique identification information acquired by the information processing apparatus, the information processing apparatus including an acquiring unit configured to acquire the unique identification information from a device including the unique identification information that is unique to the device; a storage unit configured to store identification information that is allowed to execute image processing; and an image processing unit configured to execute predetermined image processing based on an image processing request, when the received request information is the image processing request for requesting the predetermined image processing, and the received request information includes the identification information that is allowed to execute image processing.

20 Claims, 10 Drawing Sheets

(56) References Cited

U.S. PATENT DOCUMENTS

| | | | |
|---|---|---|---|
| 2014/0351364 A1* | 11/2014 | Rosenberg | H04B 5/0031 709/213 |
| 2015/0169855 A1* | 6/2015 | Milya | G06F 21/31 726/19 |
| 2016/0054955 A1* | 2/2016 | Nakamura | G06F 3/1204 358/1.14 |
| 2016/0065759 A1* | 3/2016 | Sakaguchi | H04N 1/00307 358/1.15 |
| 2016/0316099 A1* | 10/2016 | Kato | H04N 1/00217 |

* cited by examiner

IMAGE PROCESSING APPARATUS, IMAGE PROCESSING SYSTEM, AND IMAGE PROCESSING METHOD FOR SUPPRESSING FRADULENT USAGE OF AN IMAGE PROCESSING APPARTUS BY A THIRD PARTY

BACKGROUND OF THE INVENTION

1. Field of the Invention

The present invention relates to an image processing apparatus, an image processing system, and an image processing method.

2. Description of the Related Art

An MFP (Multifunction Peripheral/Product) is an image forming apparatus in which a plurality of functions are installed, such as printing, scanning, copying, fax transmission, etc. In recent years, there has been known an image forming apparatus such as an MFP that executes image forming when a smart device, which has an NFC (Near Field Communication) function, such as a smartphone, a tablet terminal, etc., is held over an NFC tag.

Furthermore, there is known an image forming apparatus that determines whether a predetermined password is set in a reading request, when a reading request to read an image is received from a remote terminal. When the predetermined password is not set, the image forming apparatus does not send the image to the remote terminal (see, for example, Patent Document 1).

In the case of an image forming apparatus that executes image forming when a smart device is held over an NFC tag, for example, there may be instances where the NFC tag is fraudulently taken away (for example, stolen), and a third party, who has fraudulently taken away the NFC tag, acquires the image being read by a user. Furthermore, in the technology disclosed in Patent Document 1, the user needs to perform an operation of setting authentication information, such as obtaining a password managed by the image forming apparatus and making a request for reading an image to the image forming apparatus, by using the obtained password.

As described above, in an image processing apparatus such as an image forming apparatus, it has been difficult to reduce the setting operations by the user who is instructing the image processing, while suppressing fraudulent usage of the image processing apparatus by a third party.

Patent Document 1: Japanese Laid-Open Patent Publication No. 2014-7677

SUMMARY OF THE INVENTION

The present invention provides an image processing apparatus, an image processing system, and an image processing method, in which one or more of the above-described disadvantages are eliminated.

According to an aspect of the present invention, there is provided an image processing apparatus including a receiving unit configured to receive, from an information processing apparatus, request information including unique identification information acquired by the information processing apparatus, the information processing apparatus including an acquiring unit configured to acquire the unique identification information from a device including the unique identification information that is unique to the device; a storage unit configured to store identification information that is allowed to execute image processing; and an image processing unit configured to execute predetermined image processing based on an image processing request, when the received request information is the image processing request for requesting the predetermined image processing, and the received request information includes the identification information that is allowed to execute image processing.

According to an aspect of the present invention, there is provided an image processing system including an image processing apparatus; a device including unique identification information that is unique to the device, the device being provided in association with the image processing apparatus; and an information processing apparatus capable of communicating with the image processing apparatus, wherein the information processing apparatus includes an acquiring unit configured to acquire the unique identification information from the device including the unique identification information, and a sending unit configured to send request information including the acquired unique identification information to the image processing apparatus, and wherein the image processing apparatus includes a receiving unit configured to receive the request information from the information processing apparatus, a storage unit configured to store identification information that is allowed to execute image processing, and an image processing unit configured to execute predetermined image processing based on an image processing request, when the received request information is the image processing request for requesting execution of the predetermined image processing, and the received request information includes the identification information that is allowed to execute image processing.

According to an aspect of the present invention, there is provided an image processing method including receiving, from an information processing apparatus, request information including unique identification information acquired by the information processing apparatus, the unique identification information being acquired by the information processing apparatus from a device including the unique identification information that is unique to the device; storing identification information that is allowed to execute image processing; and executing predetermined image processing based on an image processing request, when the received request information is the image processing request for requesting the predetermined image processing, and the received request information includes the identification information that is allowed to execute image processing.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

<System Configuration>

Figure 1:
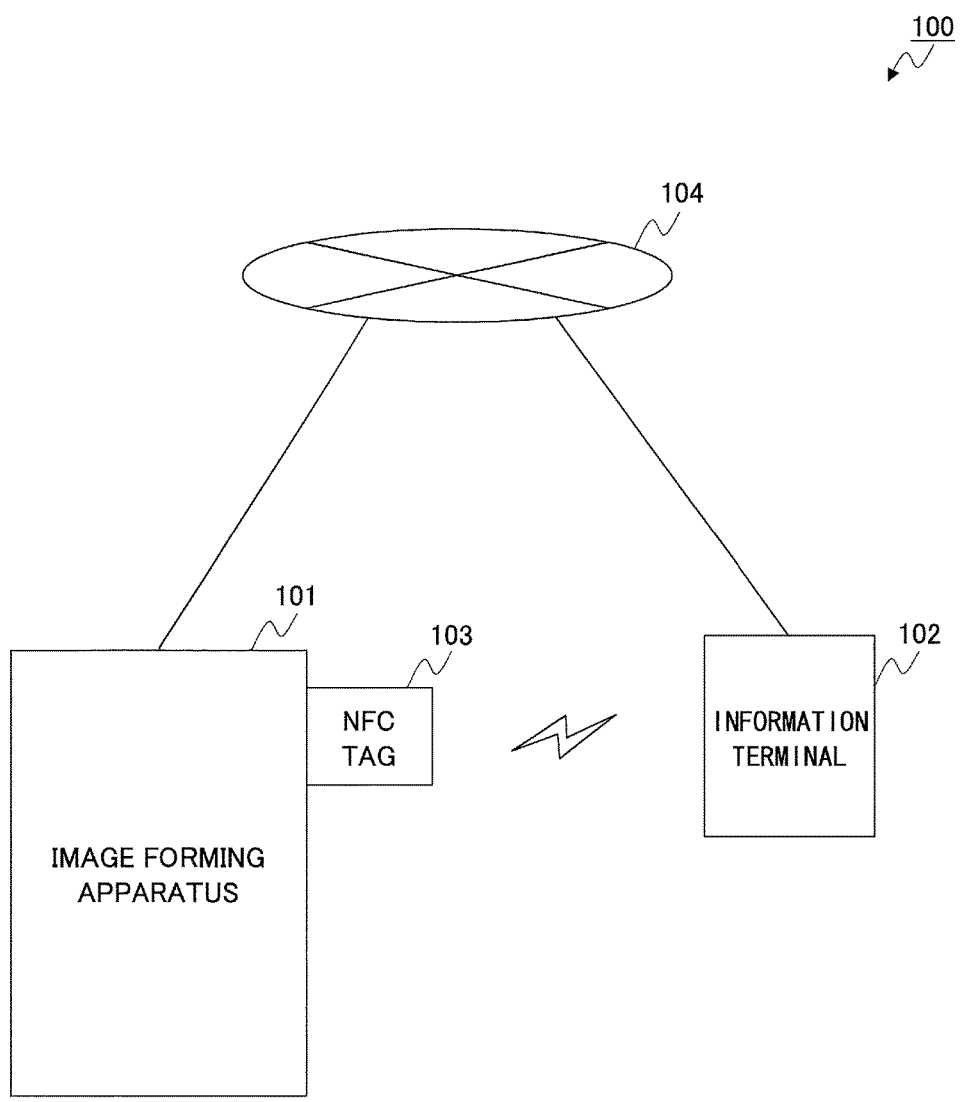
FIG. 1 illustrates a configuration example of an image processing system according to an embodiment.

FIG. 1 illustrates a configuration example of an image processing system according to an embodiment. In the image processing system 100, for example, an image forming apparatus 101 and an information terminal 102 are communicatively connected to each other via a network 104 that is an IP (Internet Protocol) network, such as the Internet, a LAN, etc. Furthermore, an NFC (Near Field Communication) tag 103 associated with the image forming apparatus 101, is set at the image forming apparatus 101 or around the image forming apparatus 101 (for example, on a wall, a pillar, a desk, etc., around the image forming apparatus 101).

The image forming apparatus 101 is, for example, a MFP (Multifunction Peripheral/Product) in which a plurality of functions such as printing, scanning, copying, fax transmission, etc., are accommodated in a single housing. Alternatively, the image forming apparatus 101 may be an image forming apparatus including a single function, such as a printer, a scanner, a copier, a fax machine, etc. Note that the image forming apparatus 101 is an example of an image processing apparatus according to the present embodiment.

The image forming apparatus 101 is connected to the network 104 by, for example, a wired or wireless LAN, etc. Alternatively, for example, the image forming apparatus 101 may have a function of Wi-Fi Direct (registered trademark) or an access point of wireless LAN, such that the image forming apparatus 101 provides the network 104 by itself by a wireless LAN.

The information terminal 102 is, for example, an information processing apparatus such as a smartphone, a tablet terminal, etc. Furthermore, the information terminal 102 may be an electronic device such as a mobile phone, a tablet terminal, a game console, a PDA, a digital camera, etc. The information terminal 102 can be connected to the network 104 by, for example, a wireless LAN, etc.

Furthermore, the information terminal 102 includes an NFC communication function, and by bringing the information terminal 102 close to the NFC tag 103 by a predetermined distance (for example, within 10 cm), the information terminal 102 can perform NFC communication with the NFC tag 103. Note that NFC communication is an example of short-distance wireless communication, and the information terminal 102 may perform the short-distance wireless communication based on another communication standard, etc.

The NFC tag 103 stores a tag ID, which is identification information unique to the NFC tag 103. For example, when the information terminal 102 comes close to the NFC tag 103, the NFC tag 103 sends tag information including a tag ID to the information terminal 102 by short-distance wireless communication. Preferably, the NFC tag 103 stores connection information (for example, an IP address, etc.) of the image forming apparatus 101, and sends tag information including connection information of the image forming apparatus 101, together with the tag ID, to the information terminal 102 that has come close to the NFC tag 103. The NFC tag 103 is preferably set (attached) at the image forming apparatus 101 or on a wall, a pillar, a desk, etc., around the image forming apparatus 101, at a location where the user can easily bring the information terminal 102 close to the NFC tag 103.

Note that the NFC tag 103 is an example of a device having unique identification information. For example, the NFC tag 103 may be a short-distance wireless device other than an NFC tag 103, such as an NFC reader/writer that is attached to or built in the image forming apparatus 101.

By the above configuration, the user can acquire the connection information of the image forming apparatus 101 by holding the information terminal 102 over (bring close to) the NFC tag 103 provided in association with the image forming apparatus 101, and can establish communication between the information terminal 102 and the image forming apparatus 101.

Furthermore, in the information terminal 102, an application program for using the image forming function of the image forming apparatus 101 is installed. By holding the information terminal 102 over the NFC tag 103, the information terminal 102 can request the image forming apparatus 101 to execute predetermined image forming. For example, the user can send a request to execute scanning to the image forming apparatus 101, by setting an original document that is the scan target in the image forming apparatus 101 and holding the information terminal 102 over the NFC tag 103. The image forming apparatus 101, which has received the request to execute scanning, reads the set original document, and sends the image data, which is obtained by reading the original document, to the information terminal 102.

In the image processing system 100 according to the present embodiment, the image processing request, which is sent from the information terminal 102 to the image forming apparatus 101, includes the identification information (tag ID) unique to the NFC tag 103 acquired from the NFC tag 103 by the information terminal 102. Furthermore, the image forming apparatus 101 stores, in advance, the tag ID that is allowed to execute image processing. When the tag ID, which is included in the request to execute image processing received from the information terminal 102, matches the tag ID stored in advance in the image forming apparatus 101, the predetermined image processing is executed.

Therefore, by the image processing system 100 according to the present embodiment, it is possible to provide a mechanism by which the image forming apparatus 101 executes predetermined image processing, only when the information terminal 102 is held over the NFC tag 103 that is registered in the image forming apparatus 101 in advance.

That is, the image processing system 100 according to the present embodiment facilitates the reduction of setting operations by the user who is instructing the image processing, while suppressing fraudulent usage (for example, stealing) of the image forming apparatus 101 (image processing apparatus) by a third party.

<Hardware Configuration>

(Hardware Configuration of Image Forming Apparatus)

Figure 2:
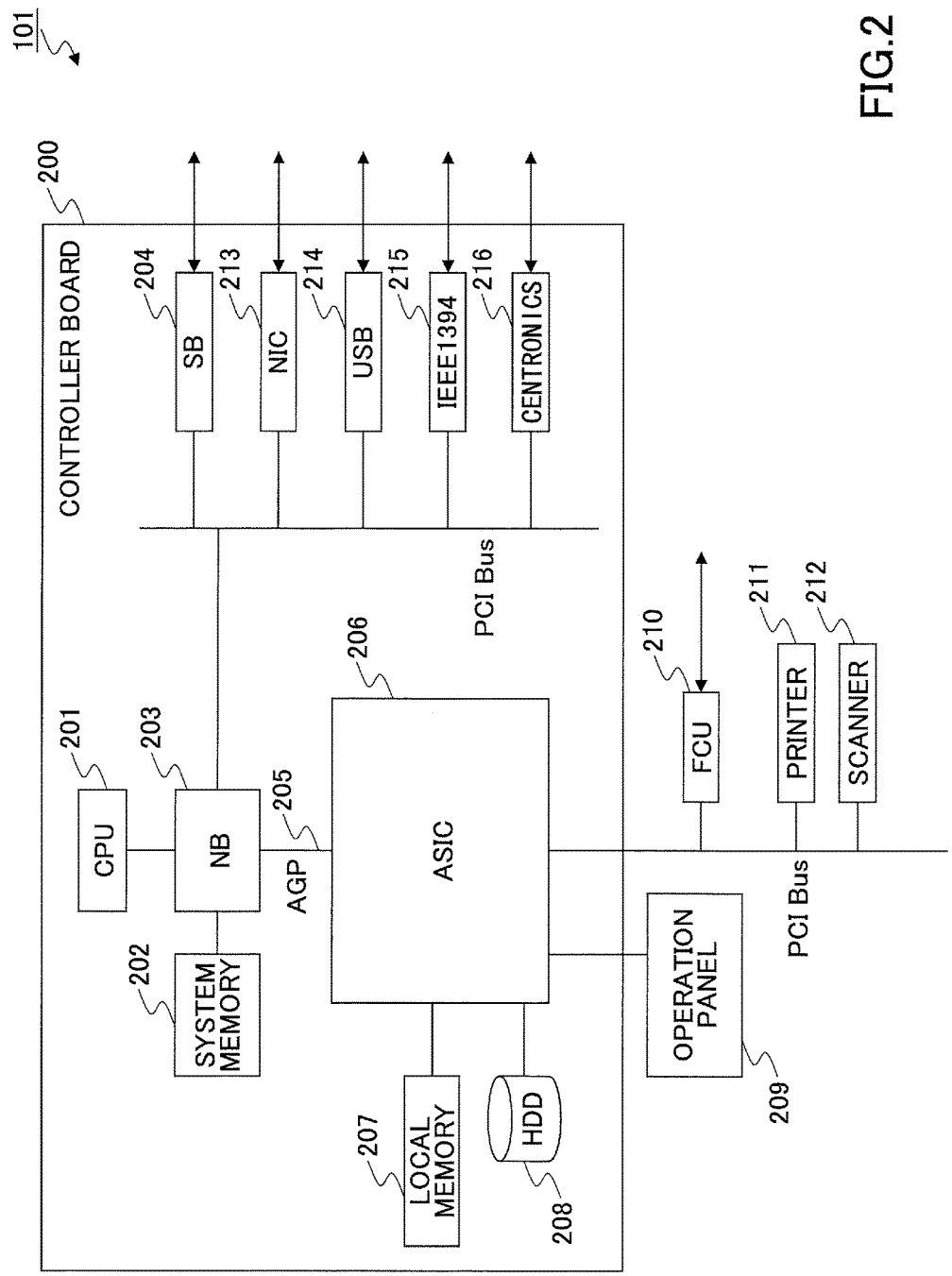
FIG. 2 illustrates a hardware configuration example of an image forming apparatus according to an embodiment.

FIG. 2 illustrates a hardware configuration example of the image forming apparatus 101 according to an embodiment. Here, a description is given of a hardware configuration example in a case where the image forming apparatus 101 is an MFP. Note that the image forming apparatus 101 and the MFP are examples of an image processing apparatus.

For example, the image forming apparatus 101 includes a controller board 200, an operation panel 209, a FCU (Facsimile Control Unit) 210, and hardware engines such as a printer 211, a scanner 212, etc.

The controller board 200 includes a configuration of a general computer, such as a CPU (Central Processing Unit) 201, a system memory 202, a NB (North Bridge) 203, a SB (South Bridge) 204, an ASIC (Application Specific Integrated Circuit) 206, a local memory 207, a HDD (Hard Disk Drive) 208, an NIC (Network Interface Card) 213, a USB (Universal Serial Bus) interface 214, an IEEE 1394 interface 215, and a centronics interface 216.

The operation panel 209 is connected to the ASIC 206 of the controller board 200. Furthermore, the SB 204, the NIC 213, the USB interface 214, the IEEE 1394 interface 215, and the centronics interface 216 are connected to the NB 203 by a PCI bus. Furthermore, the FCU 210, the printer 211, and the scanner 212 are connected to the ASIC 206 of the controller board 200 by a PCI bus.

Note that in the controller board 200, the local memory 207, the HDD 208, etc., are connected to the ASIC 206, and the CPU 201 and the ASIC 206 are connected via the NB 203 of the CPU chip set. Furthermore, the ASIC 206 and the NB 203 are not connected via the PCI bus, but are connected via an AGP (Accelerated Graphics Port) 205 for the purpose of increasing the speed.

The CPU 201 is a processor for controlling the entire image forming apparatus 101. The CPU 201 executes programs stored in the HDD 208, etc., such as the operating system, applications, and various services, and implements the functions of the image forming apparatus 101.

The NB 203 is a bridge for connecting the CPU 201, the system memory 202, the SB 204, and the ASIC 206. The system memory 202 is a memory used as a drawing memory, etc., of the image forming apparatus 101. The SB 204 is a bridge for connecting the NB 203 and the PCI bus, and peripheral devices. Furthermore, the local memory 207 is, for example, a memory used as an image buffer for copying and a code buffer. The system memory 202 or the local memory 207 may be simply referred to as a memory or a storage area in the following descriptions.

The ASIC 206 is an integrated circuit for the purpose of image processing including hardware elements for image processing. The HDD 208 is a storage device for storing, for example, images, programs, font data, forms, etc.

Furthermore, the operation panel 209 is a hardware element (operation unit) for receiving input operations from the user, and also a hardware element (display unit) for displaying information to the user. The FCU 210 sends and receives fax data according to a standard such as G3 FAX (Group 3 Facsimile). The printer 211 performs printing according to, for example, the control by a program operating in the CPU 201. The scanner 212 reads images according to, for example, the control by a program operating in the CPU 201.

The NIC 213 is a communication interface for connecting the image forming apparatus 101 to the network 104 and sending and receiving data. The USB interface 214 is a serial bus interface for connecting, for example, a recording medium such as a USB memory and various USB devices. The IEEE 1394 interface 215 is an interface for connecting a device complying with the IEEE 1394 high-speed serial bus standard. The centronics interface 216 is an interface for connecting a device complying with a centronics specification that is a specification of a parallel port.

(Hardware Configuration of Information Terminal)

Figure 3:
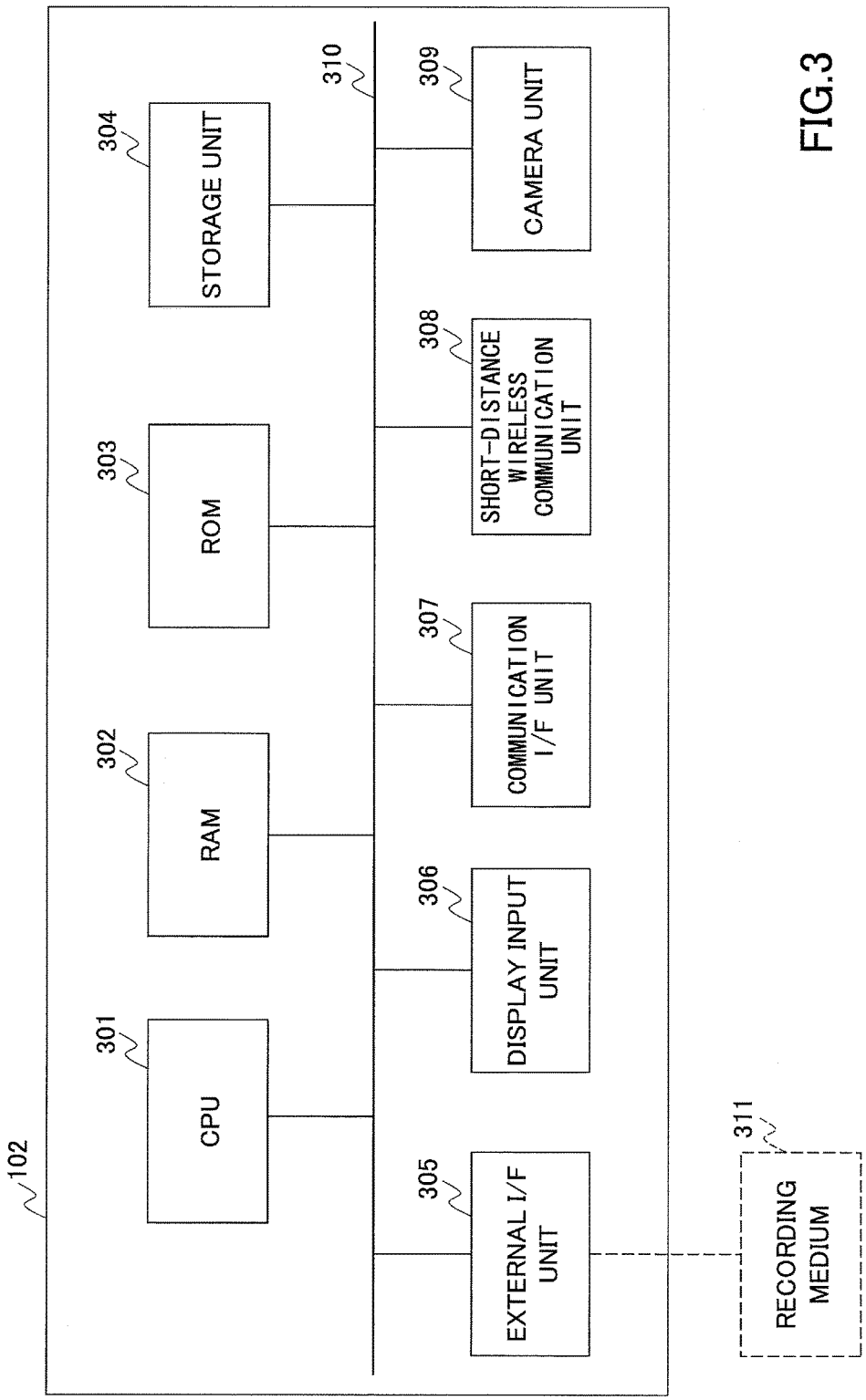
FIG. 3 illustrates a hardware configuration example of an information terminal according to an embodiment.

FIG. 3 illustrates a hardware configuration example of the information terminal 102 according to an embodiment. The information terminal 102 has a configuration of a general-purpose computer, and includes, for example, a CPU 301, a RAM (Random Access Memory) 302, a ROM (Read Only Memory) 303, a storage unit 304, an external I/F (Interface) unit 305, a display input unit 306, a communication I/F unit 307, a short-distance wireless communication unit 308, a camera unit 309, a bus 310, etc.

The CPU 301 is an arithmetic device for implementing various functions of the information terminal 102, by loading the programs and data stored in the ROM 303, the storage unit 304, etc., into the RAM 302, and executing processes. The RAM 302 is a volatile memory used as a work area, etc., of the CPU 301. The ROM 303 is a non-volatile memory for holding programs and data even after the power is turned off, and is constituted by, for example, a flash ROM, etc.

The storage unit 304 is a storage device such as a HDD, SSD (Solid State Drive), etc., and stores, for example, an OS (Operating System), an application program, various kinds of data, etc. The external I/F unit 305 is an interface between the information terminal 102 and an external device. The external device is a recording medium 311, such as a USB memory, a memory card, an optical disk, etc.

The display input unit 306 is, for example, a touch panel display, etc., in which a touch panel and a display are integrated in a single body. The display input unit 306 includes an input unit for operating the information terminal 102 and a display unit for displaying processing results, etc., obtained by the information terminal 102. Note that in the display input unit 306, the display unit and the input unit may be separately provided, or at least one of the display unit and the input unit may be provided outside the information terminal 102.

The communication I/F unit 307 is an interface for connecting the information terminal 102 to the network 104. The information terminal 102 can perform transmission and reception of data with the image forming apparatus 101, etc., via the communication I/F unit 307.

The short-distance wireless communication unit 308 is an interface for performing short-distance wireless communication with the NFC tag 103, etc. The information terminal 102 performs NFC communication with the NFC tag 103, as the short-distance wireless communication unit 308 is brought close to the NFC tag 103. The camera unit 309 images a target to acquire an image. The bus 310 is commonly connected to the above elements, and transmits address signals, data signals, various control signals, etc.

First Embodiment

<Functional Configuration>

Figure 4:
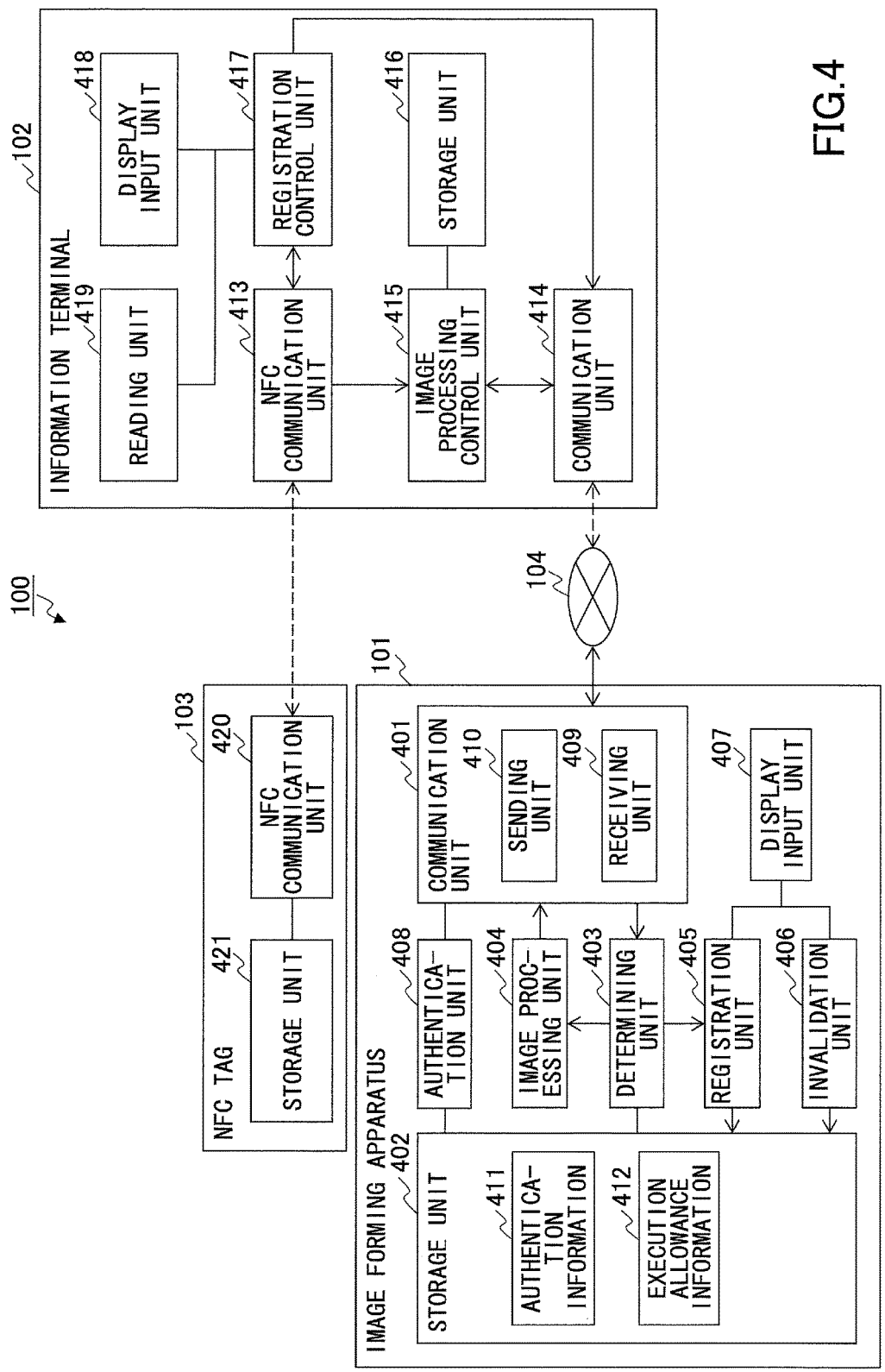
FIG. 4 is a functional configuration diagram of the image processing system according to a first embodiment.

FIG. 4 is a functional configuration diagram of the image processing system 100 according to a first embodiment. The image processing system 100 includes the image forming apparatus 101 connected to the network 104, the NFC tag 103 provided in association with the image forming apparatus 101, and the information terminal 102 that can be connected to the network 104.

(Functional Configuration of Image Forming Apparatus)

The image forming apparatus 101 includes a communication unit 401, a storage unit 402, a determining unit 403, an image processing unit 404, a registration unit 405, an invalidation unit 406, a display input unit 407, an authentication unit 408, etc.

The communication unit 401 is for connecting the image forming apparatus 101 to the network 104, and for performing communication with the information terminal 102. The communication unit 401 is realized by, for example, the NIC 213 and a program operating in the CPU 201, etc. Furthermore, the communication unit 401 includes a receiving unit 409 and a sending unit 410.

The receiving unit 409 receives request information including an acquired tag ID, from the information terminal 102 (information processing apparatus) including a NFC communication unit 413 (acquiring unit) that acquires a tag ID from the NFC tag 103 storing the tag ID (unique identification information). The sending unit 410 sends, to the information terminal 102, the data generated by the predetermined image processing (for example, a scanning process) by the image processing unit 404.

The storage unit 402 stores the tag ID (identification information) that is allowed to execute image processing, as execution allowance information 412. Furthermore, the storage unit 402 can also store information such as authentication information 411 used for authentication by the authentication unit 408. The storage unit 402 is realized by, for example, the HDD 208 of FIG. 2.

The determining unit 403 is a unit for determining the process content, according to the type of request information received by the receiving unit 409 and the tag ID, etc., included in the request information. The determining unit 403 is realized by, for example, a program operating in the CPU 201 of FIG. 2.

The determining unit 403 reports a received image processing request to the image processing unit 404, when the request information received by the receiving unit 409 is an image processing request for requesting predetermined image processing, and the received request information includes a tag ID that is allowed to execute image processing stored in the execution allowance information 412. Meanwhile, the determining unit 403 rejects or ignores the received image processing request, when the request information received by the receiving unit 409 is an image processing request for requesting predetermined image processing, but the received request information does not include a tag ID that is allowed to execute predetermined image processing.

Furthermore, the determining unit 403 reports a received registration request to the registration unit 405, when the request information received by the receiving unit 409 is a registration request for requesting to register the identification information acquired by the information terminal 102.

Note that the functional configuration of FIG. 4 is merely one example, and the above functions of the determining unit 403 may be included in the receiving unit 409, the image processing unit 404, the registration unit 405, etc.

The image processing unit 404 executes the predetermined image processing provided by the image forming apparatus 101, such as printing, copying, scanning, fax transmission and reception, etc., in the case the image forming apparatus 101 is an MFP. The image processing unit 404 is realized by, for example, the FCU 210, the printer 211, the scanner 212, and a program operating in the CPU 201, etc., of FIG. 2.

By the above configuration, the image processing unit 404 executes predetermined image processing based on the image processing request, when the request information received by the receiving unit 409 is an image processing request for requesting predetermined image processing, and the received request information includes a tag ID that is allowed to execute predetermined image processing.

Meanwhile, the image forming apparatus 101 rejects or ignores the received image processing request, when the request information received by the receiving unit 409 is an image processing request for requesting predetermined image processing, but the received request information does not include an ID tag that is allowed to execute predetermined image processing.

The registration unit 405 is a unit for storing the tag ID, which is allowed to execute predetermined image processing, as the execution allowance information 412 in the storage unit 402. The registration unit 405 is realized by, for example, a program operating in the CPU 201 of FIG. 2.

When the request information received by the receiving unit 409 is a registration request requesting to register the identification information acquired by the information terminal 102, the registration unit 405 stores (registers) the tag ID, which is included in the received registration request, in the execution allowance information 412 of the storage unit 402.

The invalidation unit 406 is a unit for invalidating a specified tag ID, among the tag IDs that are allowed to execute predetermined image processing stored in the storage unit 402. The invalidation unit 406 is realized by, for example, a program operating in the CPU 201 of FIG. 2. For example, the invalidation unit 406 causes the display input unit 407 to display an editing screen of the execution allowance information 412 to prompt the administrator to select a tag ID, and invalidates the tag ID selected by the administrator by deleting the selected tag ID or setting the selected tag ID as not allowed.

Note that the administrator is a user who manages the image forming apparatus 101. For example, in an environment where a plurality of users use the image forming apparatus 101, such as in a company, it is not necessarily preferable that any user can freely change the execution allowance information 412. In this case, it is preferable that a user determined in advance is registered as the administrator, and the administrator manages the execution allowance information 412, sets the NFC tag 103, etc. Meanwhile, in a household, an office of a small number of employees, etc., the respective users may act as the administrator to manage the execution allowance information 412, set the NFC tag 103, etc.

Here, a description is given of the execution allowance information 412.

TABLE 1

| Tag ID | Whether execution of image processing is allowed |
|---|---|
| 00001 | Allowed |
| 00002 | Allowed |
| 00003 | Allowed |
| 00004 | Not allowed |
| 00005 | Not allowed |
| 00006 | Not allowed |

Table 1 indicates an example of the execution allowance information 412.

As indicated in Table 1, the execution allowance information 412 according to the present embodiment stores, in association with each other, a plurality of tag IDs and information indicating whether the plurality of tag IDs are allowed to execute predetermined image processing. In the example of Table 1, the tag IDs "00001", "00002", and "00003" are allowed to execute predetermined image processing. Meanwhile, the tag IDs "00004", "00005", and "00006" are not allowed to execute predetermined image processing.

For example, when the NFC tag 103 having the tag ID "00001" is set at the image forming apparatus 101 or near the image forming apparatus 101, the user can execute the predetermined image processing by holding the information terminal 102 over the NFC tag 103.

Furthermore, for example, when the NFC tag 103 having the tag ID "00001" has been taken away by someone, the administrator can set (for example, attach) a new NFC tag 103 having a tag ID "00002" that is allowed to execute predetermined image processing. Accordingly, by holding the information terminal 102 over the NFC tag 103 having a tag ID "00002" that has been newly set, the user can execute predetermined image processing.

In this case, the administrator preferably changes the information as to "whether the execution of image processing is allowed" with respect to the NFC tag 103 having the tag ID "00001" that has been taken away, from "allowed" to "not allowed", by the invalidation unit 406. Alternatively, the administrator may delete the NFC tag 103 having the tag ID "00001" that has been taken away, from the execution allowance information 412, by the invalidation unit 406.

Note that the NFC tag 103, which has a tag ID for which the information as to "whether the execution of image processing is allowed" is set as "not allowed" in the execution allowance information 412, is preferably prohibited from being registered again by the registration unit 405. Accordingly, for example, it is possible to prevent a situation where the user, who has fraudulently taken away (for example, stolen) the NFC tag 103 having a tag ID "00004", from re-registering the NFC tag 103 having the tag ID "00004" and fraudulently performing image processing.

Referring back to FIG. 4, the description of the functional configuration of the image forming apparatus 101 is continued.

The display input unit 407 is a unit for, for example, displaying the execution allowance information 412, and receiving an operation for invalidation from the administrator, etc. The display input unit 407 is realized by, for example, the operation panel 209 and a program operating in the CPU 201 of FIG. 2.

The authentication unit 408 is a unit for authenticating the information terminal 102, and is realized by, for example, a program operating in the CPU 201 of FIG. 2. The authentication unit 408 authenticates whether an application requesting communication to the image forming apparatus 101 from the information terminal 102, is an application that has been officially approved, for example, by using an access token. When the authentication is not allowed by the authentication unit 408, the information terminal 102 cannot communicate with the image forming apparatus 101.

An access token is a mechanism used for authentication, and has a data structure in which identification information and the authority are described. According to this data structure, the image forming apparatus 101 can give the authority to access the image forming apparatus 101, to the information terminal 102 or an application operating in the information terminal 102. Note that an access token is an example of authentication information for accessing the image forming apparatus 101. This authentication information is, for example, stored as the authentication information 411 in the storage unit 402, and the authentication unit 408 authenticates the information terminal 102 or an application operating in the information terminal 102 by using this stored authentication information 411.

(Functional Configuration of Information Terminal)

The information terminal 102 includes an NFC communication unit 413, a communication unit 414, an image processing control unit 415, a storage unit 416, a registration control unit 417, a display input unit 418, a reading unit 419, etc.

The NFC communication unit 413 is a unit for acquiring a tag ID (unique identification information) from the NFC tag 103 (device including unique identification information). The NFC communication unit 413 is realized by, for example, the short-distance wireless communication unit 308 and a program operating in the CPU 301 of FIG. 3, etc. When the user holds the information terminal 102 over the NFC tag 103, the distance between the NFC communication unit 413 and the NFC tag 103 becomes less than or equal to a predetermined distance, and therefore the NFC communication unit 413 receives tag information including the tag ID from the NFC tag 103 by NFC communication.

The communication unit 414 is a unit for connecting the information terminal 102 to the network 104 and communicating with the image forming apparatus 101. The communication unit 414 is realized by, for example, the communication I/F unit 307 and a program operating in the CPU 301 of FIG. 3, etc.

The image processing control unit 415 generates an image processing request including the tag ID acquired by the NFC communication unit 413, and controls the image processing of the image forming apparatus 101 by sending the generated image processing request to the image forming apparatus 101 via the communication unit 414. The image processing control unit 415 is realized by, for example, a program operating in the CPU 301 of FIG. 3, etc.

The storage unit 416 is a unit for storing, for example, data (for example, scan data, etc.) received from the image forming apparatus 101, according to an image processing request sent by the image processing control unit 415. Alternatively, the storage unit 416 stores print data that the image processing control unit 415 is requesting the image forming apparatus 101 to print, etc.

The registration control unit 417 generates a registration request including the tag ID acquired by the NFC communication unit 413, and controls the registration process of the image forming apparatus 101 by sending the generated registration request to the image forming apparatus 101 via the communication unit 414. The registration control unit 417 is realized by, for example, a program operating in the CPU 301 of FIG. 3, etc.

The display input unit 418 is a unit for displaying an operation screen of an application, etc., and receiving an input operation by the user, etc. The display input unit 418 is realized by, for example, the display input unit 306 of FIG. 3, etc. For example, when a tag ID is acquired by holding the information terminal 102 over the NFC tag 103, the display input unit 418 displays an operation screen, etc., used for selecting whether to send an image processing request or a registration request, and prompts the user to make a selection.

The reading unit 419 is a unit for reading a two-dimensional code such as a QR code (registered trademark), and is realized by, for example, the camera unit 309 and a program operating in the CPU 301 of FIG. 3, etc.

(Functional Configuration of NFC Tag)

The NFC tag 103 includes, for example, a NFC communication unit 420 and a storage unit 421.

The NFC communication unit 420 is a unit for performing NFC communication with the information terminal 102. The storage unit 421 stores tag information including a tag ID that is unique identification information of the NFC tag 103, connection information of the image forming apparatus 101 to which a write request is made by the information terminal 102, etc.

Here, a description is given of the tag information stored by the storage unit 421 of the NFC tag 103.

TABLE 2

| Configuration | Value | Description |
| --- | --- | --- |
| Tag ID | 00001 | ID information unique to tag (not rewritable) |
| Authentication data | ABCDE | Used for manufacturing management (not rewritable) |
| User area | IP address: 10.20.60.70 | IP address of image forming apparatus |
| | MFP1 | SSID for wireless LAN |
| | 1111111 | WEP key for wireless LAN |

Table 2 indicates an example of information stored by the storage unit 421 of the NFC tag 103.

As indicated in Table 2, the storage unit 421 of the NFC tag 103 stores tag information such as a tag ID, authentication data, the user area, etc.

A tag ID is unique identification information of the NFC tag 103, which is written in at the factory producing the NFC tag 103, etc. The authentication data is data used for the manufacturing management of the NFC tag 103. The tag ID and the authentication data cannot be rewritten by the information terminal 102, etc. Therefore, by reading the tag ID, it is possible to uniquely identify the NFC tag 103.

The user area is an area in which data can be written, according to a request from a writing device such as an NFC tag writer and the NFC communication unit 413 of the information terminal 102. In the example of Table 2, the user area stores connection information such as the IP address of the image forming apparatus 101, a SSID (Service Set Identifier) for wireless LAN, a WEP (Wired Equivalent Privacy) key for wireless LAN, etc.

The IP address of the image forming apparatus 101 is address information assigned to the image forming apparatus 101, in an IP network such as the network 104. The SSID for wireless LAN is identification information of the wireless LAN network. The WEP key for wireless LAN is an encryption key of the wireless LAN network.

When the information terminal 102 is already connected to the same network 104 as the image forming apparatus 101, the information terminal 102 can access the image forming apparatus 101 by using the IP address of the image forming apparatus 101. Furthermore, when the information terminal 102 is not connected to the same network 104 as the image forming apparatus 101, the information terminal 102 can connect to the network 104 by using the SSID for wireless LAN and the WEP key, and subsequently access the image forming apparatus 101 by using the IP address. Furthermore, when the image forming apparatus 101 provides the network 104 by itself by a Wi-Fi Direct function, etc., the information terminal 102 can directly connect to the image forming apparatus 101 by wireless LAN by using the SSID for wireless LAN and the WEP key.

Note that the NFC tag 103 operates by receiving power from a predetermined NFC tag writer, an NFC tag reader, etc., in a non-contact manner. In the present embodiment, the NFC tag 103 operates by receiving power from the NFC communication unit 413 of the information terminal 102.

<Process Flow>
(Image Forming Process)

Figure 5:
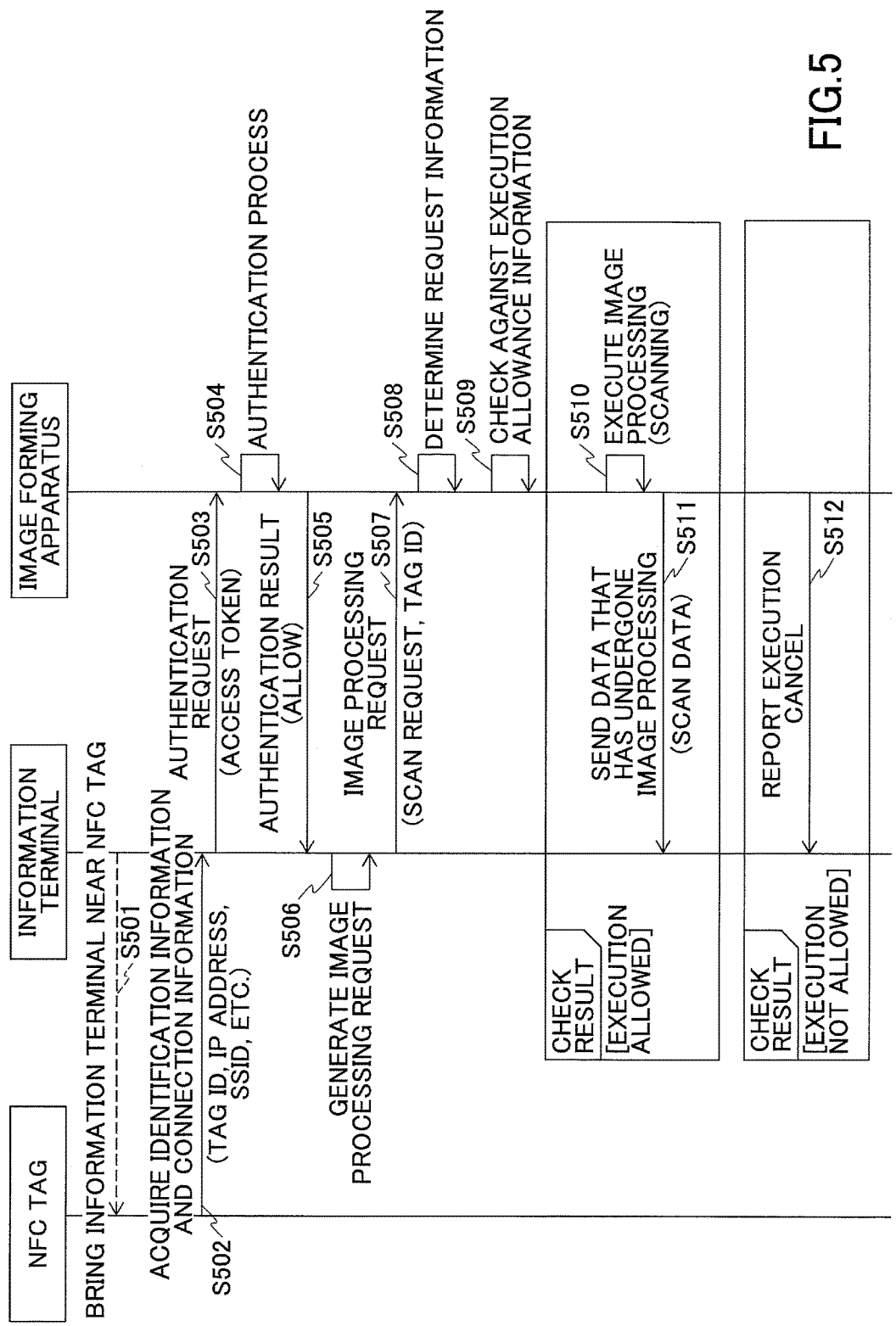
FIG. 5 is a sequence chart illustrating an example of an image forming process according to the first embodiment.

FIG. 5 is a sequence chart illustrating an example of an image forming process according to the first embodiment. Note that in FIG. 5, the communication between the information terminal 102 and the NFC tag 103 is assumed to be performed by short-distance wireless communication such as NFC communication. Furthermore, the communication between the information terminal 102 and the image forming apparatus 101 is assumed to be performed via the network 104 such as an IP network. Furthermore, the dashed arrow in the figure indicates an operation by the user.

In step S501, as the user holds the information terminal 102 over (brings close to) the NFC tag 103, the information terminal 102 acquires the identification information of the NFC tag 103 and the connection information of the image forming apparatus 101, from the NFC tag 103 (step S502). Note that the identification information of the NFC tag 103 corresponds to, for example, the tag ID in Table 2, and the connection information of the image forming apparatus 101 corresponds to, for example, the IP address of the image forming apparatus 101 in Table 2. Preferably, the connection information of the image forming apparatus 101 includes, for example, the SSID of wireless LAN and the WEP key of wireless LAN in Table 2.

In step S503, the information terminal 102 sends an authentication request to the image forming apparatus 101 according to the acquisition of the identification information from the NFC tag 103. In the present embodiment, the authentication request sent by the information terminal 102 includes the access token described above, as the authentication information.

In step S504, the authentication unit 408 of the image forming apparatus 101 that has received the authentication request from the information terminal 102, uses the authentication information 411 stores in the storage unit 402, to authenticate the received authentication information (access token). When the authentication is allowed, the image forming apparatus 101 allows the communication with the information terminal 102, and sends an authentication result indicating that the authentication is allowed, to the information terminal 102 (step S505). Meanwhile, when the authentication is not allowed, the image forming apparatus 101 rejects the communication with the information terminal 102, sends an authentication result indicating that the authentication is not allowed to the information terminal 102, and ends the process. Note that the example of FIG. 5 indicates a case where the authentication is allowed.

In step S506, the information terminal 102, which has received the authentication result indicating that authentication has been allowed from the image forming apparatus 101, generates an image processing request (for example, a scan request) including the tag ID (unique identification information) of the NFC tag 103 acquired in step S502.

In step S507, the information terminal 102 sends the generated image processing request (example of request information) to the image forming apparatus 101. In the example of FIG. 5, the image processing request includes a scan request for requesting to read the image to the image forming apparatus 101, and a tag ID that is identification information of the NFC tag 103, etc.

In step S508, the image forming apparatus 101, which has received the request information from the information terminal 102, determines the request type of the request information (step S508). In the example of FIG. 5, the received request information is an image processing request, and therefore the image forming apparatus 101 checks the tag ID included in the image processing request against one or more identification information items stored in the execution allowance information 412 as identification information that is allowed to execute predetermined image processing (step S509).

In step S509, when the image processing request includes identification information that is allowed to execute image processing stored in the execution allowance information 412, the image forming apparatus 101 executes the requested image processing (scanning) based on the image processing request (step S510). Furthermore, the image forming apparatus 101 sends the data (scan data) generated by executing the image processing in step S510, to the information terminal 102 (step S511).

Meanwhile, in step S509, when the image processing request does not include identification information that is allowed to execute image processing stored in the execution allowance information 412, for example, the image forming apparatus 101 rejects to execute the requested image processing, and sends a report to the information terminal 102 that the execution has been cancelled (step S512). Alternatively, instead of rejecting to execute the image processing, the image forming apparatus 101 may ignore the image processing request.

By the above process, the image processing system 100 according to the present embodiment can provide a mechanism in which the image forming apparatus 101 performs predetermined image processing only when the information terminal 102 is held over the NFC tag 103 registered in the image forming apparatus 101.

(Registration Process)

Figure 6:
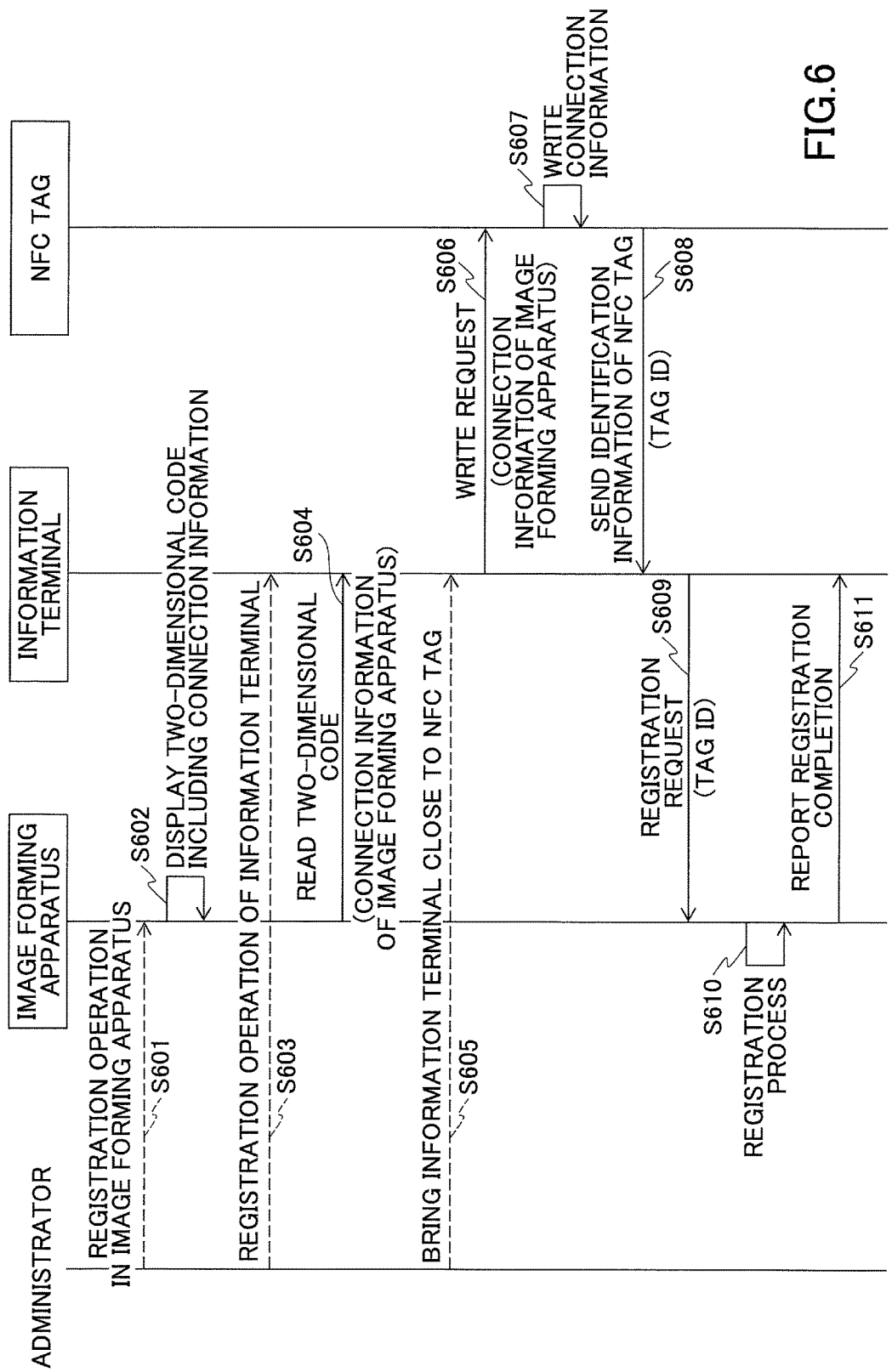
FIG. 6 is a sequence chart illustrating an example of a process of registering identification information according to the first embodiment.

FIG. 6 is a sequence chart illustrating an example of a process of registering identification information according to the first embodiment. By this registration process, for example, the administrator can register a new NFC tag 103 for requesting image processing to the image forming apparatus 101. Furthermore, the administrator can register a NFC tag 103 by adding a NFC tag 103 for requesting image processing to the image forming apparatus 101.

Note that in FIG. 6, the communication between the information terminal 102 and the NFC tag 103 is assumed to be performed by short-distance wireless communication such as NFC communication.

Furthermore, the communication between the information terminal 102 and the image forming apparatus 101 is assumed to be performed via the network 104 such as an IP network. Furthermore, the dashed arrow in the figure indicates an operation by the user.

In step S601, the administrator performs an operation of registering the identification information (tag ID) defined in advance in the image forming apparatus 101. According to this operation, for example, the image forming apparatus 101 shifts to a registration mode for registering identification information, and causes the display input unit 407 to display a two-dimensional code such as a QR code (step S602). This two-dimensional code includes the connection information of the image forming apparatus 101, such as the IP address of the image forming apparatus 101, a SSID for wireless LAN, a WEP key for wireless LAN, etc.

In step S603, the administrator performs a registration operation of registering the identification information defined in advance, in the information terminal 102. According to this operation, for example, the information terminal 102 shifts to a registration mode for registering identification information, such that the reading unit 419 can read the two-dimensional code. For example, the administrator moves the information terminal 102 to a position and a direction such that the two-dimensional code can be read, while viewing the display screen of the information terminal 102. Accordingly, the information terminal 102 can read the two-dimensional code displayed on the display input unit 407 of the image forming apparatus 101, and acquire the connection information of the image forming apparatus 101 (step S604).

In step S605, the administrator holds the information terminal 102 over (brings close to) the NFC tag 103. Accordingly, the information terminal 102 requests the NFC tag 103 to write the connection information of the image forming apparatus 101 (step S606).

In step S607, the NFC tag 103, which has received a request to write the connection information of the image forming apparatus 101 from the information terminal 102, stores the connection information of the image forming apparatus 101 in a user area, etc., of the storage unit 421. Accordingly, for example, the NFC tag 103 will include tag information as indicated in Table 2.

In step S608, the information terminal 102 acquires identification information (tag ID) of the NFC tag 103, from the NFC tag 103. Furthermore, according to the acquisition of the tag ID from the NFC tag 103, the information terminal 102 sends a registration request (example of request information) to register the tag ID of the NFC tag 103, to the image forming apparatus 101 (step S609).

The image forming apparatus 101, which has received the registration request to register the tag ID of the NFC tag 103 from the information terminal 102, performs a registration process of registering the tag ID included in the registration request, in the storage unit 402, as the execution allowance information 412 (step S610). With respect to the tag ID that has undergone the registration process, for example, the information indicating whether the execution of image processing is allowed in Table 1, is registered as "allowed". When the registration of the tag ID is completed, the image forming apparatus 101 reports to the information terminal 102 that the registration has been completed (step S611).

(Authentication Cancelling Process)

Figure 7:
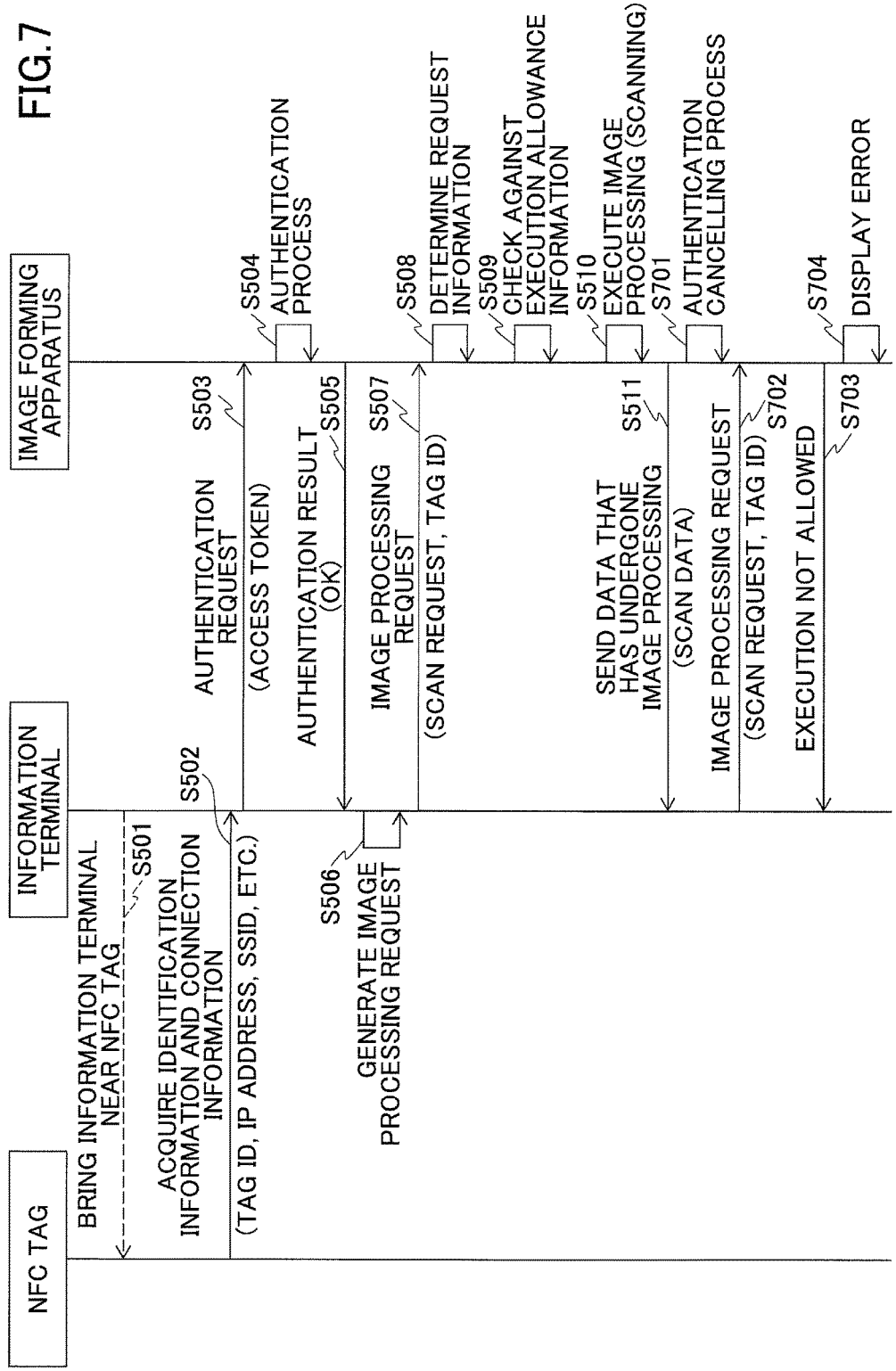
FIG. 7 is a sequence chart illustrating an example of an authentication cancelling process according to the first embodiment.

FIG. 7 is a sequence chart illustrating an example of an authentication cancelling process according to the first embodiment. By this cancelling process, the image forming apparatus 101 cancels the connection with the information terminal 102, and becomes able to receive the next image processing. Note that the processes of steps S501 through S511 of FIG. 7 are the same as the processes when execution of image processing is allowed in FIG. 5, and therefore the differences from FIG. 5 are mainly described below.

When the transmission of the data that has undergone image processing is completed in step S511, the image forming apparatus 101 performs a process of cancelling the authentication of the information terminal 102 (step S701). After the authentication is cancelled in step S701, the image forming apparatus 101 receives an image processing request from the information terminal 102 (step S702), and for example, the image forming apparatus 101 reports to the information terminal 102 that execution of the image processing is not possible (step S703). Furthermore, the image forming apparatus 101 may display an error message on the display input unit 407 (step S704).

By the above processes, the image forming apparatus 101 cancels the authentication of the information terminal 102 according to the completion of the image processing requested from the information terminal 102, and therefore another user can immediately request the image forming apparatus 101 to perform the next process. Furthermore, when the same user wants to continue to request a process, the user is to hold the information terminal 102 over the NFC tag 103 again, to start the image forming process of FIG. 5.

Figure 8:
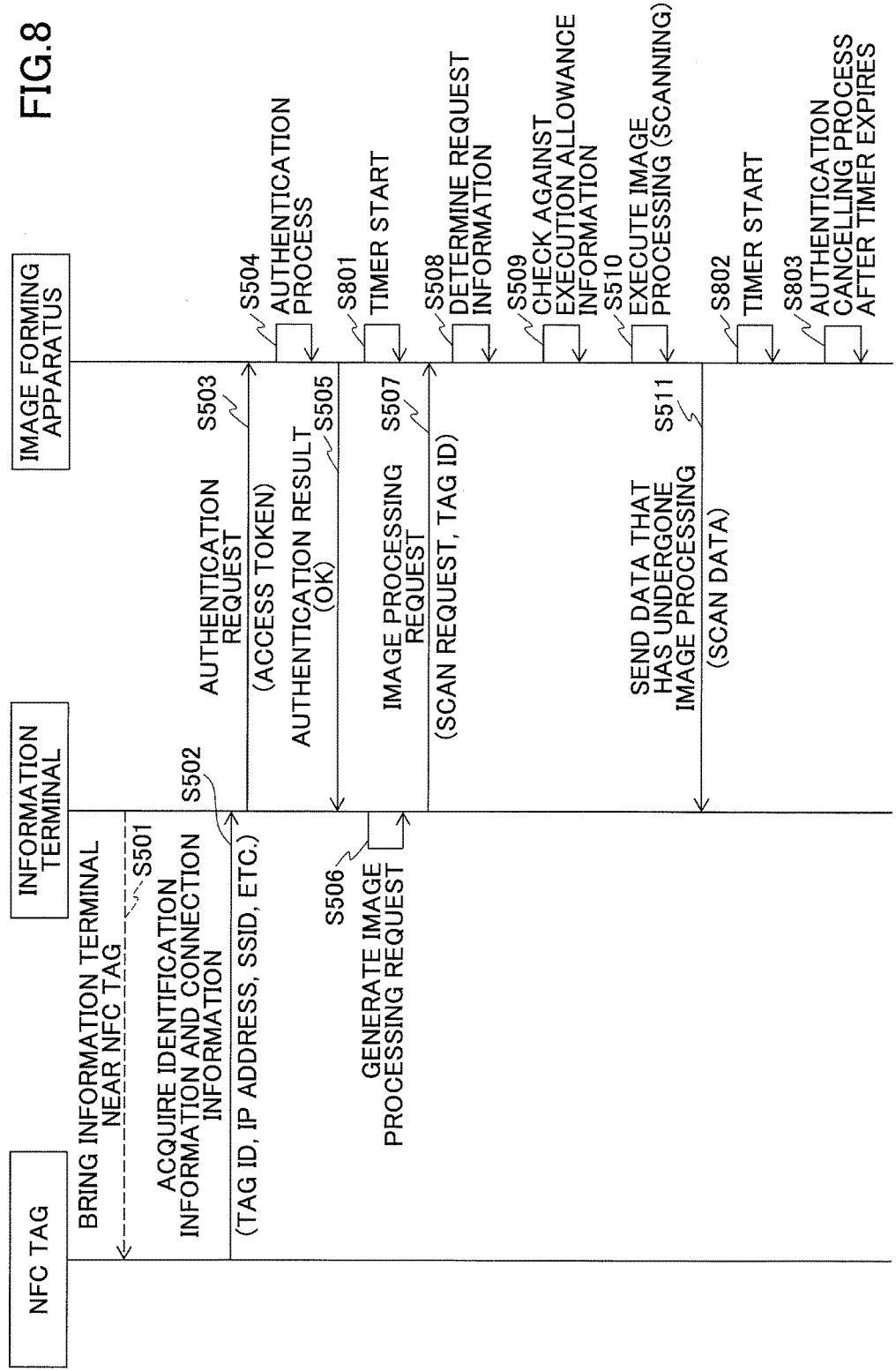
FIG. 8 is a sequence chart illustrating another example of an authentication cancelling process according to the first embodiment.

FIG. 8 is a sequence chart illustrating another example of an authentication cancelling process according to the first embodiment. In the authentication cancelling process of FIG. 7, the user needs to hold the information terminal 102 over the NFC tag 103, every time image processing is to be executed. However, the image forming apparatus 101 may be able to receive the next process from the information terminal 102 during a predetermined period after the image processing has ended.

Note that the processes of steps S501 through S511 of FIG. 8 are the same as the processes when execution of image processing is allowed in FIG. 5, and therefore the differences from FIG. 5 are mainly described below.

When the image forming apparatus 101 completes the transmission of the data that has undergone image processing in step S511 in FIG. 8, for example, the image forming apparatus 101 starts timekeeping by a timer for a predetermined period (for example, five minutes) (step S802). Furthermore, when the timer that has started timekeeping in step S802 expires, the image forming apparatus 101 cancels the authentication of the information terminal 102 (step S803). By the above processes, the user can consecutively execute a plurality of image processing operations, without the need of holding the information terminal 102 over the NFC tag 103 every time the image processing is to be executed.

Furthermore, as indicated in step S801 of FIG. 8, the image forming apparatus 101 may start a similar timer after sending the authentication result in step S505, and wait for an image processing request from the information terminal 102 for a predetermined period. Accordingly, the image forming apparatus 101 is able to cancel the authentication of the information terminal 102 and receive an image processing request from another user (information terminal), when an image processing request is not made for more than a predetermined time period after the authentication of the information terminal 102 is allowed.

(Process of Changing Execution Allowance Information)

Figure 9:
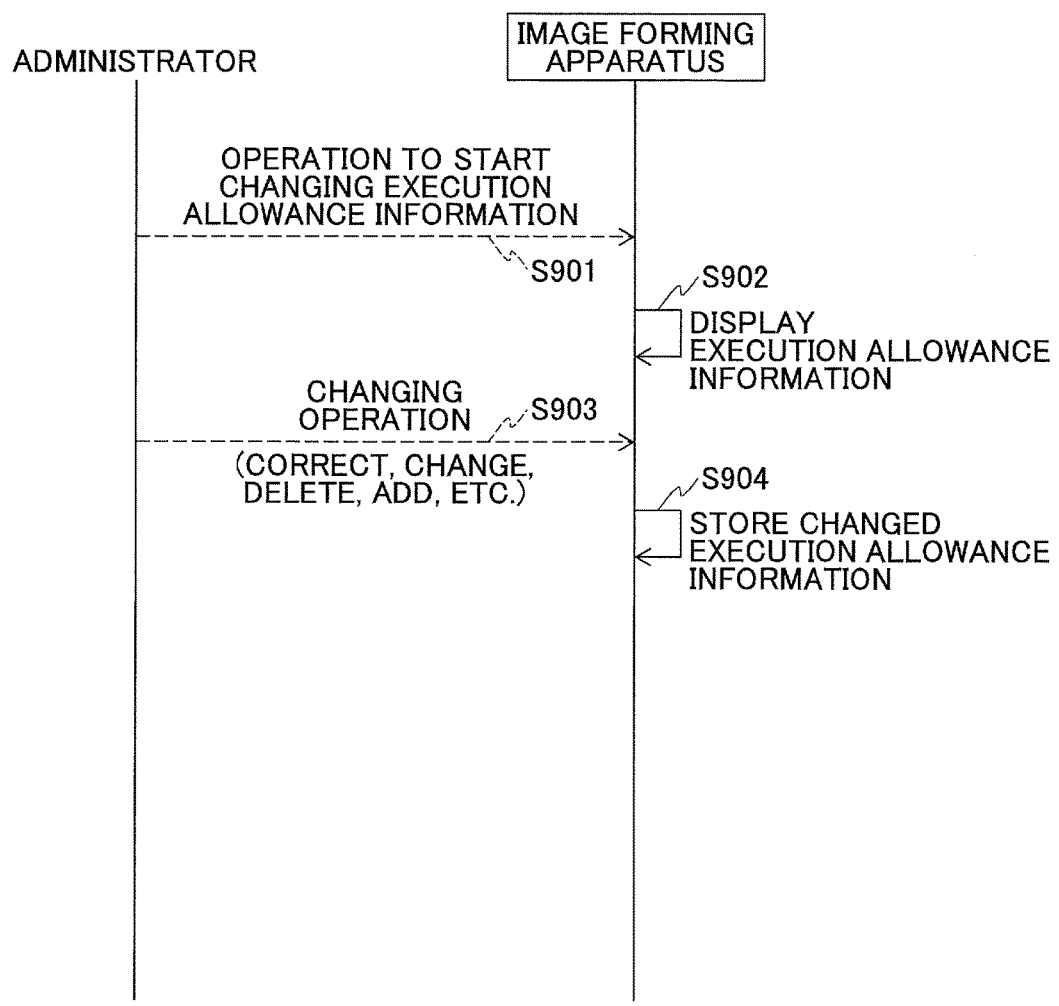
FIG. 9 is a sequence chart illustrating an example of a process of changing the execution allowance information according to the first embodiment.

FIG. 9 is a sequence chart illustrating an example of a process of changing the execution allowance information according to the first embodiment. The execution allowance information 412 of the image forming apparatus 101 can be subjected to a changing process of, for example, deleting a tag ID that has been registered, changing the information indicating whether the execution of image processing is allowed, etc., by the administrator.

In step S901, for example, the administrator of the image forming apparatus 101 performs an operation for starting to change the execution allowance information 412, to the image forming apparatus 101.

In step S902, the image forming apparatus 101 displays the execution allowance information 412 stored in the storage unit 402, on the display input unit 407.

In step S903, the administrator is able to edit the execution allowance information 412 from the display input unit 407 to perform an invalidating process, such as deleting the tag ID and changing the information indicating whether execution of image processing is allowed to "not allowed". Furthermore, in step S903, the administrator may be able to perform a changing process such as adding information to and correcting the execution allowance information 412.

In step S904, the image forming apparatus 101 stores the changed execution allowance information 412 (update).

By the above processes, for example, when the NFC tag 103 is taken away by someone, the administrator can delete the taken NFC tag 103 from the execution allowance information 412, and reduce the possibility of the image forming apparatus 101 being fraudulently used with the use of the taken NFC tag 103.

Second Embodiment

In the first embodiment, the execution allowance information 412 stored by the image forming apparatus 101 can store one or more tag IDs. In a second embodiment, the allowance information 412 stored by the image forming apparatus 101 stores a single tag ID.

Note that the system configuration diagram and the functional configuration diagram of the second embodiment are the same as those of the first embodiment. Furthermore, in the present embodiment, a single tag ID is stored in the execution allowance information 412 of table 1, and the image forming apparatus 101 allows image processing with respect to the single tag ID stored in the execution allowance information 412.

Figure 10:
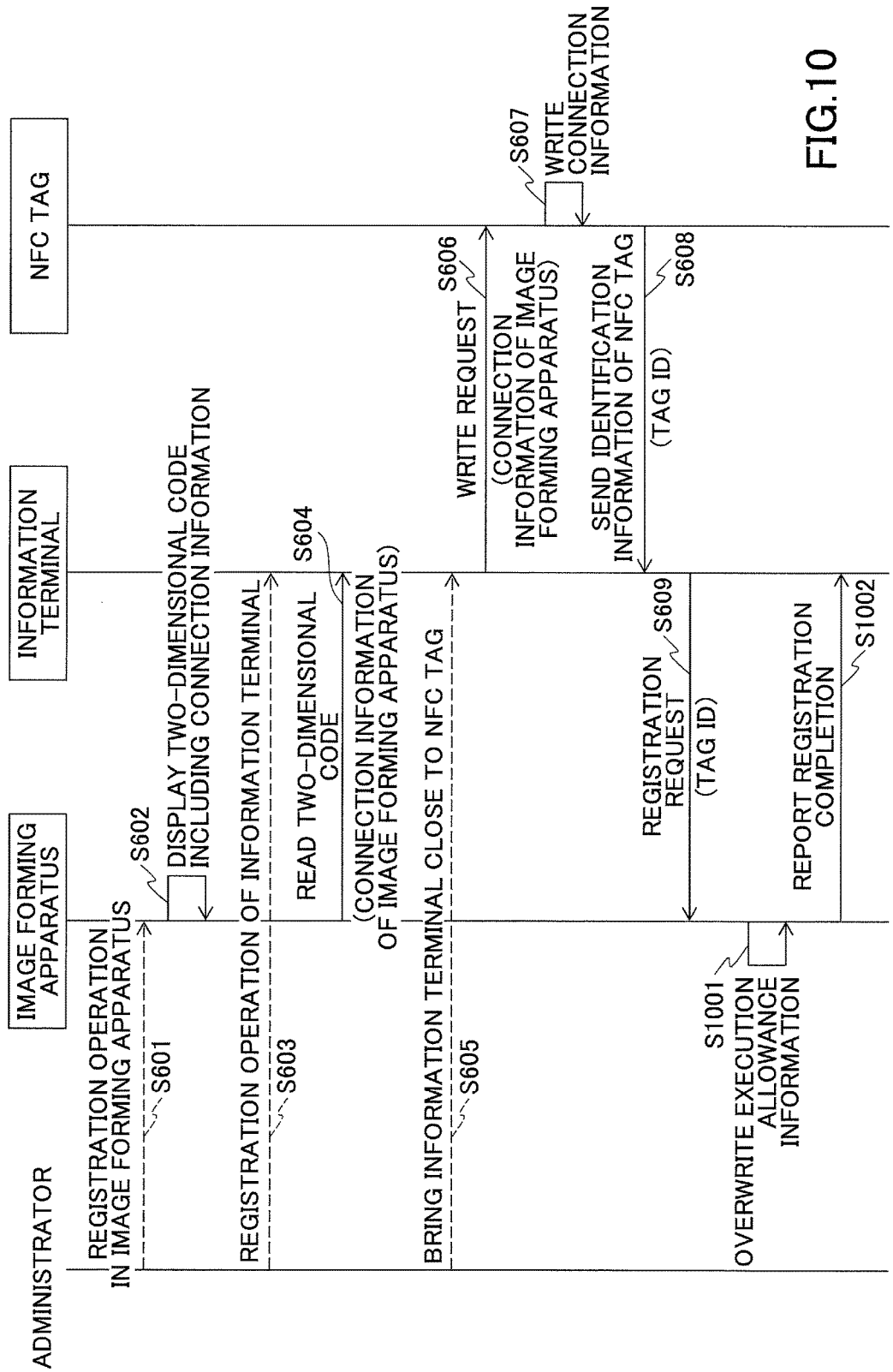
FIG. 10 is a sequence chart illustrating an example of a process of registering identification information according to a second embodiment.

FIG. 10 is a sequence chart illustrating an example of a process of registering identification information according to the second embodiment. Note that the processes of steps S601 through S609 of FIG. 10 are the same as the registration process according to the first embodiment illustrated in FIG. 6, and therefore the differences from FIG. 6 are mainly described below.

When the request to register the tag ID of the NFC tag 103 is received from the information terminal 102 in step S609, the image forming apparatus 101 overwrites the single tag ID stored in the execution allowance information 412, with the received tag ID (step S1001). When the registration of the tag ID is completed, the image forming apparatus 101 reports to the information terminal 102 that the registration is completed (step S1002).

In the present embodiment, only one tag ID can be stored in the execution allowance information 412 stored in the image forming apparatus 101, and therefore when a new tag ID is registered, the tag ID that has been registered up to now is automatically erased. Therefore, the administrator is able to reduce the possibility of the image forming apparatus 101 being fraudulently used with the use of the NFC tag 103 before being updated, without the need to perform a process of invalidating a tag ID by the changing process of FIG. 9.

<Overview>

An image processing apparatus (101) according to the present embodiment includes a receiving unit (409) configured to receive, from an information processing apparatus (102), request information including unique identification information acquired by the information processing apparatus, the information processing apparatus including an acquiring unit (413) configured to acquire the unique identification information from a device (103) including the unique identification information that is unique to the device. Furthermore, the image processing apparatus (101) includes a storage unit (402) configured to store identification information that is allowed to execute image processing. Furthermore, the image processing apparatus (101) includes an image processing unit (404) configured to execute predetermined image processing based on an image processing request, when the received request information is the image processing request for requesting the predetermined image processing, and the received request information includes the identification information that is allowed to execute image processing.

By the above configuration, for example, when the image processing apparatus (101) receives an image processing request including identification information, which is allowed to execute image processing, stored in the storage unit (402), the image processing apparatus (101) performs image processing according to the received image processing request. Therefore, the image processing apparatus (101) can suppress fraudulent usage of the image processing apparatus (101), according to an image processing request that does not include identification information stored in the storage unit (402), etc. Furthermore, the unique identification included in the image processing request is acquired by the acquiring unit (413) of the information processing apparatus (102), and therefore it is possible to reduce setting operations such as setting authentication information, etc., by the user instructing the image processing.

According to one embodiment of the present invention, an image processing apparatus, an image processing system, and an image processing method are provided, which facilitate the reduction of setting operations by the user who is instructing the image processing, while suppressing fraudulent usage of an image processing apparatus by a third party.

The image processing apparatus, the image processing system, and the image processing method are not limited to the specific embodiments described herein, and variations and modifications may be made without departing from the spirit and scope of the present invention.

The present application is based on and claims the benefit of priority of Japanese Priority Patent Application No. 2015-045669, filed on Mar. 9, 2015, the entire contents of which are hereby incorporated herein by reference.

What is claimed is:

1. An image processing apparatus comprising:
   a hardware processor;
   a hardware memory containing instructions, which when executed, cause the hardware processor to function as:
      a receiving unit configured to receive, through a network, from an information processing apparatus, an image processing request including first identification information acquired by the information processing apparatus from a device, the device storing the first identification information, which identifies the device uniquely, and address data set at the image processing apparatus, the image processing request being sent from the information processing apparatus using the address data acquired from the device;
      a storage unit configured to store execution allowance information, the execution allowance information including device identification information and an information item indicating whether the device identification information is allowed or not allowed to execute predetermined image processing;
      a determining unit configured to, in response to receiving the image processing request, determine that the received image processing request is to be executed after determining that the first identification information included in the received image processing request matches the stored device identification information and the stored device identification information corresponds to an information item, included in the execution allowance information, that indicates that execution of predetermined image processing is allowed; and
      an image processing unit configured to execute an image processing process including one of printing, scanning, copying, or fax transmission, based on the received image processing request when the determining unit determines that the received image processing request is to be executed.

2. The image processing apparatus according to claim 1, wherein, in the case that the received first identification information does not match the device identification information, the image processing unit is configured to reject or ignore the image processing request received by the receiving unit.

3. The image processing apparatus according to claim 1, wherein the instructions, when executed, cause the hardware processor to function as:
   a registration unit configured to register, in the storage unit, the acquired first identification information, in response to a registration request for requesting to register the acquired first identification information.

4. The image processing apparatus according to claim 1, wherein
   the execution allowance information includes a plurality of pieces of the device identification information, each piece of device identification information stored in association with a corresponding information item indicating whether the piece of device identification information is allowed or not allowed to execute predetermined image processing, and wherein
   the instructions, when executed, cause the hardware processor to function as
      an invalidating unit configured to invalidate a selected one of the plurality of pieces of the device identification information.

5. The image processing apparatus according to claim 4, wherein the invalidating unit causes display of a display editing screen that is configured to prompt the user to select the selected one of the plurality of the pieces of the device identification information, and
   wherein the invalidating unit changes the information item corresponding to the selected one of the plurality of pieces of the device identification information from information that indicates that execution of predetermined image processing is allowed to information that indicates that execution of predetermined image processing is not allowed.

6. The image processing apparatus according to claim 5, wherein the selected one of the plurality of pieces of the device identification information, that corresponds to the information item changed to information that indicates that execution of predetermined image processing is not allowed, is prohibited from being registered again by the registration unit.

7. The image processing apparatus according to claim 1, wherein the first identification information is identification information of an NFC (Near Field Communication) tag, which is written into the NFC tag.

8. An image processing system comprising:
   an image processing apparatus;
   a device that stores first identification information that identifies the device uniquely, and address data set at the image processing apparatus, the device being provided in association with the image processing apparatus; and
   an information processing apparatus capable of communicating with the image processing apparatus, wherein
   the information processing apparatus includes
      a hardware processor;
      a hardware memory containing instructions, which when executed, cause the hardware processor to function as:
         an acquiring unit configured to acquire the first identification information and the address data from the device storing the first identification information and the address data, and a sending unit configured to send an image processing request that includes the first identification information acquired by the acquiring unit from the device, to the image processing apparatus; wherein the image processing request is sent from the information processing apparatus using the address data acquired from the device, and wherein the image processing apparatus includes another hardware processor;

another hardware memory containing instructions, which when executed, cause the another hardware processor to function as:

a receiving unit configured to receive, through a network, the image processing request from the information processing apparatus, a storage unit configured to store execution allowance information, the execution allowance information including device identification information and an information item indicating whether the device identification information is allowed or not allowed to execute predetermined image processing;

a determining unit configured to, in response to receiving the image processing request, determine that the received image processing request is to be executed after determining that the first identification information included in the received image processing request matches the stored device identification information and the stored device identification information corresponds to an information item, included in the execution allowance information, that indicates that execution of predetermined image processing is allowed; and an image processing unit configured to execute an image processing process including one of printing, scanning, copying, or fax transmission, based on the received image processing request when the determining unit determines that the received image processing request is to be executed.

9. The image processing system according to claim 8, wherein the acquiring unit acquires the first identification information from the device including the first identification information, by short-distance wireless communication.

10. The image processing system according to claim 8, wherein the device including the first identification information is a NFC (Near Field Communication) tag.

11. The image processing system according to claim 8, wherein the first identification information that identifies the device uniquely cannot be rewritten by the information processing apparatus.

12. The image processing system according to claim 8, wherein the sending unit is configured to send an authentication request to the image processing apparatus according to the first identification information acquired by the acquiring unit from the device.

13. The image processing system according to claim 8, wherein after the image processing unit executes the image processing process based on the image processing request received by the receiving unit, the image processing apparatus cancels connection between the image processing apparatus and the information processing apparatus.

14. The image processing system according to claim 13, wherein after the image the image processing apparatus cancels connection between the image processing apparatus and the information processing apparatus, the image processing apparatus reports to the information processing apparatus that execution of image processing is not possible.

15. The image processing system according to claim 13, wherein after the image the image processing apparatus cancels connection between the image processing apparatus and the information processing apparatus, the receiving unit of the image processing apparatus receives a new request from a user to execute a new process, and wherein the new request from the user is performed by holding the information processing apparatus over the device.

16. The image processing system according to claim 13, wherein the image processing apparatus cancels connection between the image processing apparatus and the information processing apparatus after a timer of the image processing apparatus indicates that a predetermined period of time has elapsed.

17. The image processing system according to claim 8, wherein the first identification information is identification information of an NFC (Near Field Communication) tag, which is written into the NFC tag.

18. The image processing system according to claim 8, wherein, in the case that the received first identification information does not match the device identification information, the image processing unit is configured to reject or ignore the image processing request received by the receiving unit.

19. An image processing method comprising:

receiving, through a network, from an information processing apparatus, an image processing request including first identification information acquired by the information processing apparatus, wherein the first identification information is acquired by the information processing apparatus from a device and identifies the device uniquely; the device storing the first identification information and address data set at the image processing apparatus; the image processing request being sent from the information processing apparatus using the address data acquired from the device;

storing execution allowance information, the execution allowance information including device identification information and an information item indicating whether the device identification information is allowed or not allowed to execute predetermined image processing;

determining, in response to receiving the image processing request, that the received image processing request is to be executed after determining that the first identification information included in the received image processing request matches the stored device identification information and the stored device identification information corresponds to an information item, included in the execution allowance information, that indicates that execution of predetermined image processing is allowed; and executing an image processing process including one of printing, scanning, copying, or fax transmission, based on the received image processing request when it is determined that the received image processing request is to be executed.

20. The image processing method according to claim 19, wherein the first unique identification information and the second unique identification information are is unique identification information of an NFC (Near Field Communication) tag, which is written into the NFC tag.

* * * * *

UNITED STATES PATENT AND TRADEMARK OFFICE
CERTIFICATE OF CORRECTION

PATENT NO. : 10,154,173 B2
APPLICATION NO. : 15/001576
DATED : December 11, 2018
INVENTOR(S) : Yuuichi Yoshida Page 1 of 1

It is certified that error appears in the above-identified patent and that said Letters Patent is hereby corrected as shown below:

On the Title Page

Item (54), delete:
"IMAGE PROCESSING APPARATUS, IMAGE PROCESSING SYSTEM, AND IMAGE PROCESSING METHOD FOR SUPPRESSING FRADULENT USAGE OF AN IMAGE PROCESSING APPARTUS BY A THIRD PARTY"

Insert:
--IMAGE PROCESSING APPARATUS, IMAGE PROCESSING SYSTEM, AND IMAGE PROCESSING METHOD FOR SUPPRESSING FRAUDULENT USAGE OF AN IMAGE PROCESSING APPARATUS BY A THIRD PARTY--

Signed and Sealed this
Thirtieth Day of April, 2019

Andrei Iancu
*Director of the United States Patent and Trademark Office*